(12) United States Patent
Ilkal et al.

(10) Patent No.: US 11,823,286 B2
(45) Date of Patent: Nov. 21, 2023

(54) DEPENDENT DIMENSIONS

(71) Applicant: Sage Intacct, Inc., San Jose, CA (US)

(72) Inventors: Nadeem Mohammed Yusuf Ilkal, Santa Clara, CA (US); Aaron Thompson, Beaverton, OR (US)

(73) Assignee: Sage Intacct, Inc., San Jose, CA (US)

( * ) Notice: Subject to any disclaimer, the term of this patent is extended or adjusted under 35 U.S.C. 154(b) by 0 days.

(21) Appl. No.: 17/076,337

(22) Filed: Oct. 21, 2020

(65) Prior Publication Data

US 2022/0122188 A1 Apr. 21, 2022

(51) Int. Cl.
*G06Q 40/12* (2023.01)
*G06Q 10/0631* (2023.01)
*G06Q 50/08* (2012.01)

(52) U.S. Cl.
CPC ..... *G06Q 40/125* (2013.12); *G06Q 10/06315* (2013.01); *G06Q 50/08* (2013.01)

(58) Field of Classification Search
CPC ...... G06Q 40/125; G06Q 40/12; G06Q 40/00; G06Q 10/06315; G06Q 10/06; G06Q 10/00
See application file for complete search history.

(56) References Cited

U.S. PATENT DOCUMENTS

| | | | | |
|---|---|---|---|---|
| 6,397,195 B1* | 5/2002 | Pinard | ................. | G06Q 40/12 708/134 |
| 6,442,554 B1* | 8/2002 | Reddy | ................. | G06Q 10/087 707/999.1 |
| 2002/0178167 A1* | 11/2002 | Kootale | ................. | G06F 16/283 |
| 2005/0055289 A1* | 3/2005 | Mehldahl | ............... | G06Q 40/12 705/30 |
| 2007/0150385 A1* | 6/2007 | Ode | ....................... | G06Q 40/12 705/30 |
| 2010/0318926 A1* | 12/2010 | Anderson | .............. | G06Q 10/10 705/30 |
| 2011/0016432 A1* | 1/2011 | Helfman | ................. | G06F 16/26 715/833 |

(Continued)

OTHER PUBLICATIONS

"Multiple Hierarchies in Dimensions", https://www.kimballgroup.com/data-warehouse-business-intelligence-resources/kimball-techniques/dimensional-modeling-techniques/multiple-hierarchies/, Kimball Group, Jun. 23, 2016, 1 page.

(Continued)

*Primary Examiner* — Namrata Boveja
*Assistant Examiner* — Divesh Patel
(74) *Attorney, Agent, or Firm* — Raubvogel Law Office

(57) ABSTRACT

Any number of distinct dependent dimensions, associated with different object types, can be created and applied to accounting transactions. The distinct dependent dimensions can be used in generating reports, for example to provide insight into particular categories of transactions. Dimensional data can be captured along with transactional data, and subsequently used for categorizing and reporting on transactions. The distinct dependent dimensions can be organized in a hierarchical manner, for improved flexibility and functionality in categorizing and reporting on transactions. In addition, the dependent dimension structure can be used when generating and presenting user interface components, so that they properly restrict dimension data picklist values and prevent inconsistent dimension value selections.

30 Claims, 11 Drawing Sheets

(56) References Cited

U.S. PATENT DOCUMENTS

| | | | | |
|---|---|---|---|---|
| 2012/0253942 A1* | 10/2012 | Garfinkle | ........... | G06Q 30/0269 |
| | | | | 705/14.66 |
| 2015/0269524 A1* | 9/2015 | Greene | ................ | G06Q 10/103 |
| | | | | 705/301 |
| 2020/0026397 A1* | 1/2020 | Wohlstadter | ........... | G16C 20/10 |

OTHER PUBLICATIONS

"Dimension Relationships", https://docs.microsoft.com/en-us/analysis-services/multidimensional-models-olap-logical-cube-objects/dimension-relationships?redirectedfrom=MSDN&view=asallproducts-allversions&viewFallbackFrom=sql-server-ver15, Aug. 28, 2020, 6 pages.

"Types of Dimensions", http://dwhlaureate.blogspot.com/2013/08/types-of-dimensions.html, Aug. 27, 2013, 4 pages.

* cited by examiner

US 11,823,286 B2

DEPENDENT DIMENSIONS

TECHNICAL FIELD

The present document relates to techniques for classifying accounting transactions for reports and other processing.

BACKGROUND

An accounting dimension is a classification mechanism that is used to organize, sort, and report on an entity's accounting information in meaningful ways. Accounting dimensions can be specified in terms of various tags, each having a set of values that can be associated with transactions and general ledger (GL) entries. In accounting software, transactions can be tagged with any number of dimension values to facilitate generation of relevant reports. In this manner, dimensions can be used to customize financial reports around specific business activities and thereby capture key metrics relevant to a particular business.

SUMMARY

In various embodiments, the system and method described herein facilitate creation of any number of distinct dependent dimensions, associated with different object types, that can be applied to accounting transactions. The distinct dependent dimensions can be used in generating reports, for example to provide insight into particular categories of transactions. Thus, dimensional data can be captured along with transactional data, and subsequently used for categorizing and reporting on transactions.

In at least one embodiment, the distinct dependent dimensions can be organized in a hierarchical manner, for improved flexibility and functionality in categorizing and reporting on transactions. In addition, in at least one embodiment, the various dependent dimensions can be based on different object types, thus allowing for greater flexibility and robustness.

In at least one embodiment, the dependent dimension structure can be used for data integrity checks while capturing transaction data, for example in an online transaction processing (OLTP) system. In addition, the dependent dimension structure can be used when generating and presenting user interface components, so that they properly restrict dimension data values in picklists and menus, and prevent inconsistent dimension value selections.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION OF THE EMBODIMENTS

Figure 1:
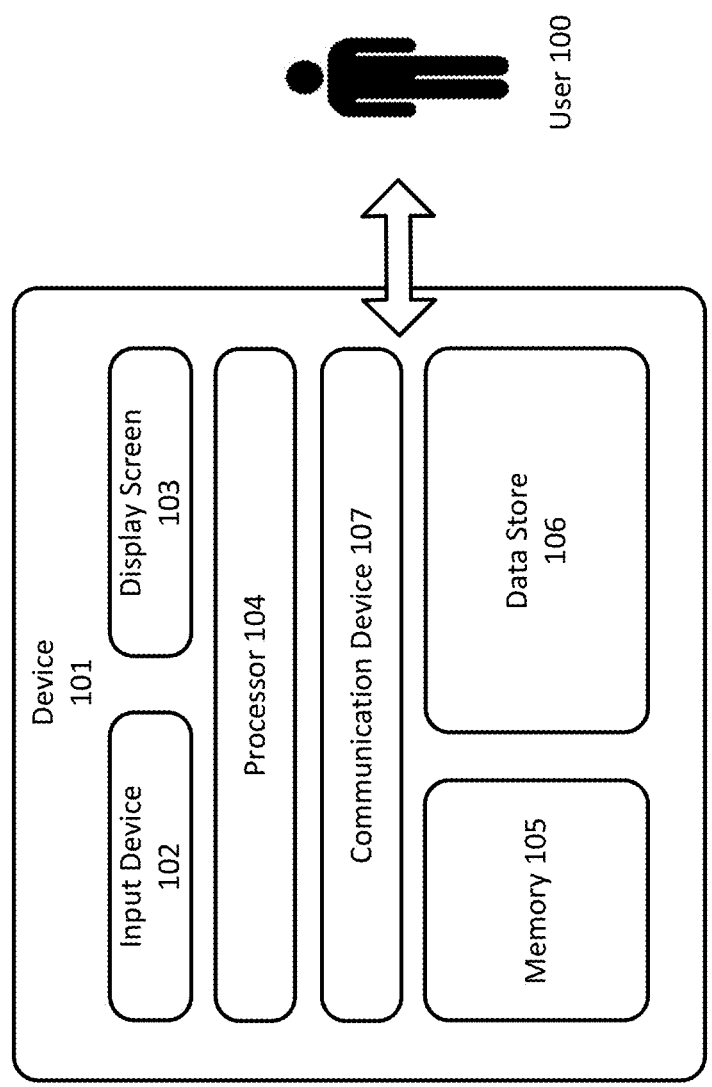
FIG. 1 is a block diagram depicting a hardware architecture for implementing the techniques described herein according to one embodiment.

The systems and methods set forth herein may be applied to many contexts in which it can be useful to classify accounting transactions according to various dimensions. For illustrative purposes, the description herein is set forth in the context of accounting software for a construction business. However, one skilled in the art will recognize that the described techniques can be used in many other contexts, including, for example, accounting software for other types of businesses. In addition, the particular hardware arrangement depicted and described herein is a simplified example for illustrative purposes.

In some embodiments, one or more components, as shown and described below in connection with FIGS. 1 and 2, may be used to implement the system and method described herein. Such components may be implemented in a cloud computing-based client/server architecture, using, for example, Amazon Web Services, an on-demand cloud computing platform available from Amazon.com, Inc. of Seattle, Washington Therefore, for illustrative purposes, the system and method are described herein in the context of such an architecture. One skilled in the art will recognize, however, that the system and method can be implemented using other architectures, such as for example a stand-alone computing device rather than a client/server architecture.

Further, the functions and/or method steps set forth below may be carried out by software running on one or more of the device 101, client device(s) 108, server 110, and/or other components. This software may optionally be multi-function software that is used to retrieve, store, manipulate, and/or otherwise use data stored in data storage devices such as data store 106, and/or to carry out one or more other functions.

In this application, a "user", such as user 100 referenced herein, is an individual, enterprise, or other group, which may optionally include one or more users. A "data store", such as data store 106 referenced below, is any device capable of digital data storage, including any known hardware for nonvolatile and/or volatile data storage. A collection of data stores 106 may form a "data storage system" that can be accessed by multiple users. A "computing device", such as device 101 and/or client device(s) 108, is any device capable of digital data processing. A "server", such as server 110, is a computing device that provides data storage, either via a local data store, or via connection to a remote data store. A "client device", such as client device 108, is an electronic device that communicates with a server, provides output to a user, and accepts input from a user.

System Architecture

According to various embodiments, the system and method can be implemented on any electronic device or set of interconnected electronic devices, each equipped to receive, store, and present information. Each electronic device may be, for example, a server, desktop computer, laptop computer, smartphone, tablet computer, and/or the like. As described herein, some devices used in connection with the system described herein are designated as client devices, which are generally operated by end users. Other devices are designated as servers, which generally conduct back-end operations and communicate with client devices (and/or with other servers) via a communications network such as the Internet. In at least one embodiment, the methods described herein can be implemented in a cloud computing environment using techniques that are known to those of skill in the art.

In addition, one skilled in the art will recognize that the techniques described herein can be implemented in other contexts, and indeed in any suitable device, set of devices, or system capable of interfacing with existing enterprise data storage systems. Accordingly, the following description is intended to illustrate various embodiments by way of example, rather than to limit scope.

Referring now to FIG. 1, there is shown a block diagram depicting a hardware architecture for practicing the described system, according to one embodiment. Such an architecture can be used, for example, for implementing the techniques of the system in a computer or other device 101. Device 101 may be any electronic device.

In at least one embodiment, device 101 includes a number of hardware components well-known to those skilled in the art. Input device 102 can be any element that receives input from user 100, including, for example, a keyboard, mouse, stylus, touch-sensitive screen (touchscreen), touchpad, trackball, accelerometer, microphone, or the like. Input can be provided via any suitable mode, including for example, one or more of: pointing, tapping, typing, dragging, and/or speech. In at least one embodiment, input device 102 can be omitted or functionally combined with one or more other components.

Data store 106 can be any magnetic, optical, or electronic storage device for data in digital form; examples include flash memory, magnetic hard drive, CD-ROM, DVD-ROM, or the like. In at least one embodiment, data store 106 stores information that can be utilized and/or displayed according to the techniques described below. Data store 106 may be implemented in a database or using any other suitable arrangement. In another embodiment, data store 106 can be stored elsewhere, and data from data store 106 can be retrieved by device 101 when needed for processing and/or presentation to user 100. Data store 106 may store one or more data sets, which may be used for a variety of purposes and may include a wide variety of files, metadata, and/or other data.

In at least one embodiment, data store 106 may store accounting transaction data and/or other data that can be used in classifying accounting transactions using distinct dependent dimensions associated with different object types. In at least one embodiment, such data can be stored at another location, remote from device 101, and device 101 can access such data over a network, via any suitable communications protocol.

In at least one embodiment, data store 106 may be organized in a file system, using well known storage architectures and data structures, such as relational databases. Examples include Oracle, MySQL, and PostgreSQL. Appropriate indexing can be provided to associate data elements in data store 106 with each other. In at least one embodiment, data store 106 may be implemented using cloud-based storage architectures such as NetApp (available from NetApp, Inc. of Sunnyvale, California) and/or Google Drive (available from Google, Inc. of Mountain View, California).

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, via a cellular network, or by any other appropriate communication systems.

In at least one embodiment, data store 106 is detachable in the form of a CD-ROM, DVD, flash drive, USB hard drive, or the like. Information can be entered from a source outside of device 101 into a data store 106 that is detachable, and later displayed after the data store 106 is connected to device 101. In another embodiment, data store 106 is fixed within device 101.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100. In at least one embodiment, an identifying label is also stored along with each data entry, to be displayed along with each data entry.

Display screen 103 can be any element that displays information such as text and/or graphical elements. In particular, display screen 103 may display a user interface for presenting data concerning distinct dependent dimensions, and/or for prompting the user to accept or reject classifications of accounting transactions using distinct dependent dimensions. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

A communication device 107 may communicate with other computing devices through the use of any known wired and/or wireless protocol(s). For example, communication device 107 may be a network interface card ("NIC") capable of Ethernet communications and/or a wireless networking card capable of communicating wirelessly over any of the 802.11 standards. Communication device 107 may be capable of transmitting and/or receiving signals to transfer data and/or initiate various processes within and/or outside device 101.

Figure 2:
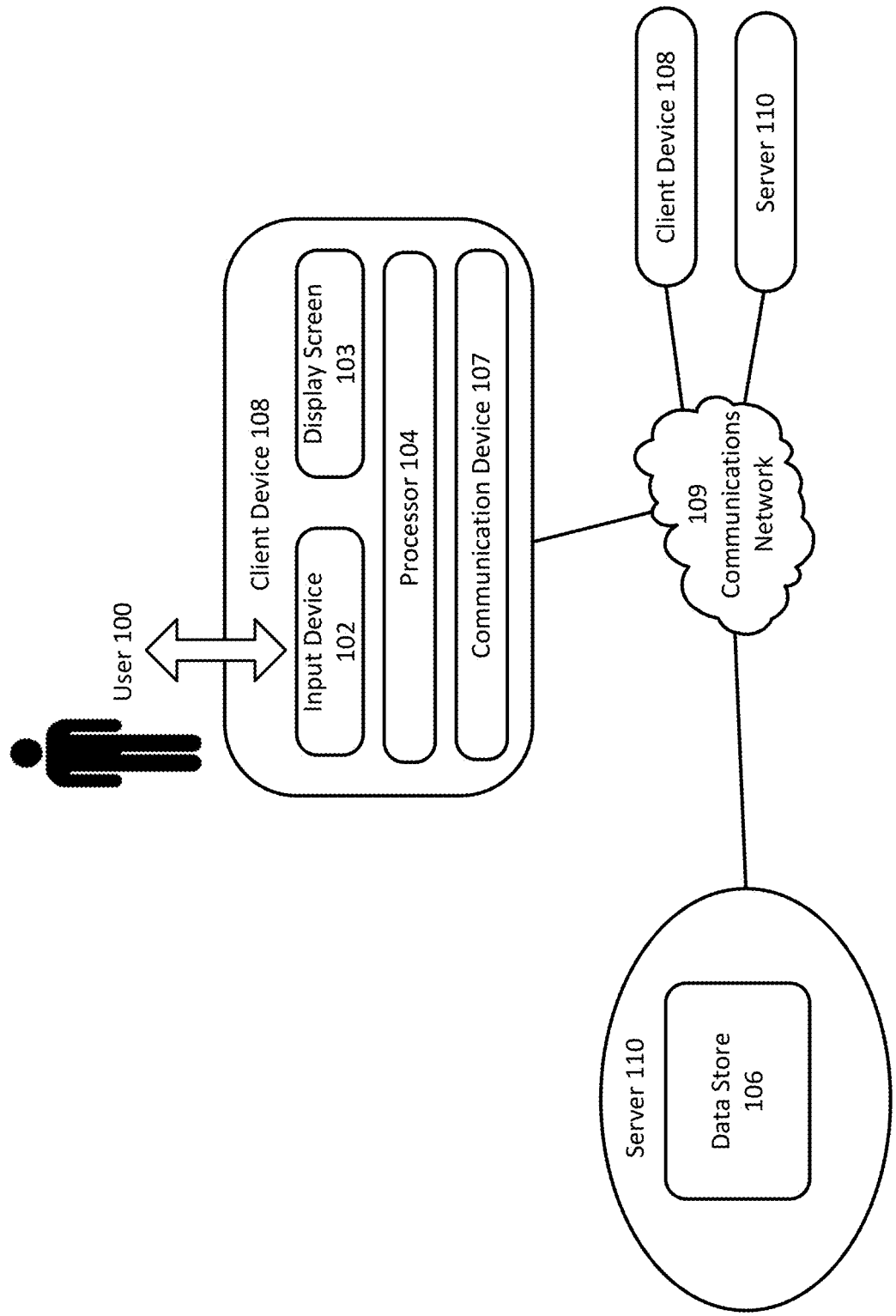
FIG. 2 is a block diagram depicting a hardware architecture for implementing the techniques described herein in a client/server environment, according to one embodiment.

Referring now to FIG. 2, there is shown a block diagram depicting a hardware architecture in a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Items from data store 106 can be presented as part of such web pages and/or other web-based resources, using known protocols and languages such as Hypertext Markup Language (HTML), Java, JavaScript, and the like.

Client device 108 can be any electronic device incorporating input device 102 and/or display screen 103, such as a desktop computer, laptop computer, personal digital assistant (PDA), cellular telephone, smartphone, music player, handheld computer, tablet computer, kiosk, game system, wearable device, or the like. Any suitable type of communications network 109, such as the Internet, can be used as the mechanism for transmitting data between client device 108 and server 110, according to any suitable protocols and techniques. In addition to the Internet, other examples include cellular telephone networks, EDGE, 3G, 4G, 5G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data. Such requests may be sent via HTTP as remote procedure calls or the like.

In one implementation, server 110 is responsible for data storage and processing, and incorporates data store 106. Server 110 may include additional components as needed for retrieving data from data store 106 in response to requests from client device 108.

As also set forth in FIG. 1, data store 106 may be organized into one or more well-ordered data sets, with one or more data entries in each set. Data store 106, however, can have any suitable structure, and may store data according to any organization system known in the information storage arts, such as databases and other suitable data storage structures. As in FIG. 1, data store 106 may store accounting transaction data and/or other data that can be used in classifying accounting transactions using distinct dependent dimensions; alternatively, such data can be stored elsewhere (such as at another server) and retrieved as needed.

In addition to or in the alternative to the foregoing, data may also be stored in a data store 106 present in client device 108. In some embodiments, such data may include elements distributed between server 110 and client device 108 and/or other computing devices in order to facilitate secure and/or effective communication between these computing devices.

As also set forth in FIG. 1, display screen 103 can be any element that displays information such as text and/or graphical elements. Various user interface elements, dynamic controls, and/or the like may be used in connection with display screen 103.

As also set forth in FIG. 1, processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software. A communication device 107 may communicate with other computing devices through the use of any known wired and/or wireless protocol(s), as also set forth in the description of FIG. 1.

In one embodiment, some or all of the system can be implemented as software written in any suitable computer programming language, whether in a standalone or client/server architecture. Alternatively, it may be implemented and/or embedded in hardware.

Notably, multiple servers 110 and/or multiple client devices 108 may be networked together, and each may have a structure similar to those of client device 108 and server 110 that are illustrated in FIG. 2. The data structures and/or computing instructions used in the performance of methods described herein may be distributed among any number of client devices 108 and/or servers 110. As used herein, "system" may refer to any of the components, or any collection of components, from FIGS. 1 and/or 2, and may include additional components not specifically described in connection with FIGS. 1 and 2.

In some embodiments, data within data store 106 may be distributed among multiple physical servers. Thus, data store 106 may represent one or more physical storage locations, which may communicate with each other via the communications network and/or one or more other networks (not shown). In addition, server 110 as depicted in FIG. 2 may represent one or more physical servers, which may communicate with each other via communications network 109 and/or one or more other networks (not shown).

In one embodiment, some or all components of the system can be implemented in software written in any suitable computer programming language, whether in a standalone or client/server architecture. Alternatively, some or all components may be implemented and/or embedded in hardware.

Dimension Hierarchies

In general, for certain industries, such the construction industry, purely horizontal GL-focused accounting solutions may not be adequate to provide appropriate classification and reporting tools for enabling insight into business operations. Such project-centric industries often require additional, more sophisticated mechanisms to accurately capture and track detailed costs against detailed project budgets. To capture such detailed costs, a tiered Work Breakdown Structure (WBS) can be used, which represents project work according to a visual hierarchy of manageable sections. The WBS can include a hierarchical definition of dimensions, such as for example a high-level Job dimension, followed by lower-level dimensions such as Cost Code (also referred to as Task) and Cost Type. As described in more detail below, the use of multiple, hierarchical, distinct dependent dimensions, associated with different object types, allows categorization and reporting on data along various dimensions, including across all transactions at any level of the WBS structure.

In at least one embodiment, the dimensions included in the WBS can be used together to build a project hierarchy. For example, a project may be independent of cost codes (tasks) or cost types; a particular set of tasks may be unique to a specific project; and a particular set of may depend on the existence of particular project and task dimensions. In at least one embodiment, the uniqueness of a cost type may be bound to a specific project and task; therefore, in at least one embodiment, the system may not let a user select a cost type without first identifying a project and task.

In at least one embodiment, accumulation types can be used to group and summarize cost type information for reporting.

Other industries can also use the distinct dependent dimensions techniques described herein to improve accounting and reporting functionality and insights. For example, in the manufacturing industry, a similar cost structure can be used, but it may be product-based rather than project-based. More particularly, in a manufacturing context, a product may have various manufacturing stages (analogous to cost codes or tasks), and associated cost types such as direct material, direct labor, indirect labor, overhead, and/or the like. Thus, the techniques described herein, including distinct dependent dimensions associated with different object types, can be applied in any industry where a cost breakdown structure can be generated.

Accounting dimensions may be organized according to any suitable hierarchy. For example, calendar date dimensions may include multiple fiscal period hierarchies, including a day-to-week hierarchy and day-to-month-to-year hierarchy. As another example, location-based dimensions may have multiple geographic hierarchies. In at least one embodiment, such separate hierarchies can coexist in a single dimension table.

Figure 6:
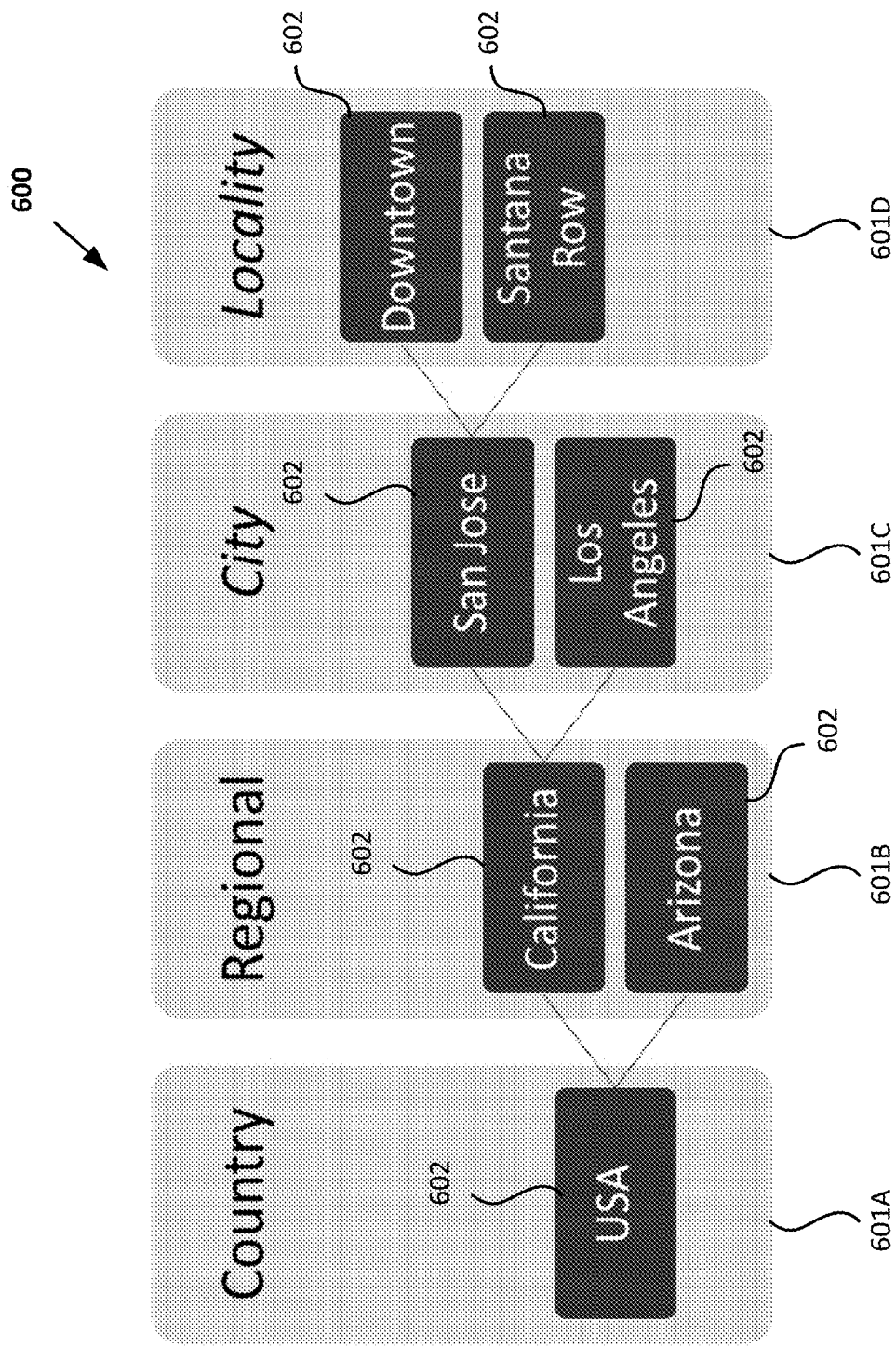
FIG. 6 is a block diagram depicting an example of a location dimension hierarchy as may be implemented according to one embodiment.

Referring now to FIG. 6, there is shown an example of a location dimension hierarchy 600 as may be implemented according to one embodiment. Hierarchy 600 includes various dimensions 601, including country dimension 601A, regional dimension 601B, city dimension 601C, and locality dimension 601D. Example dimension values 602 are shown to illustrate the hierarchical relationship among the various dimensions 601. Notably, in the example of FIG. 6, all dimension values 602 can be specified using the same object type (adapted to describing a location).

Figure 8:
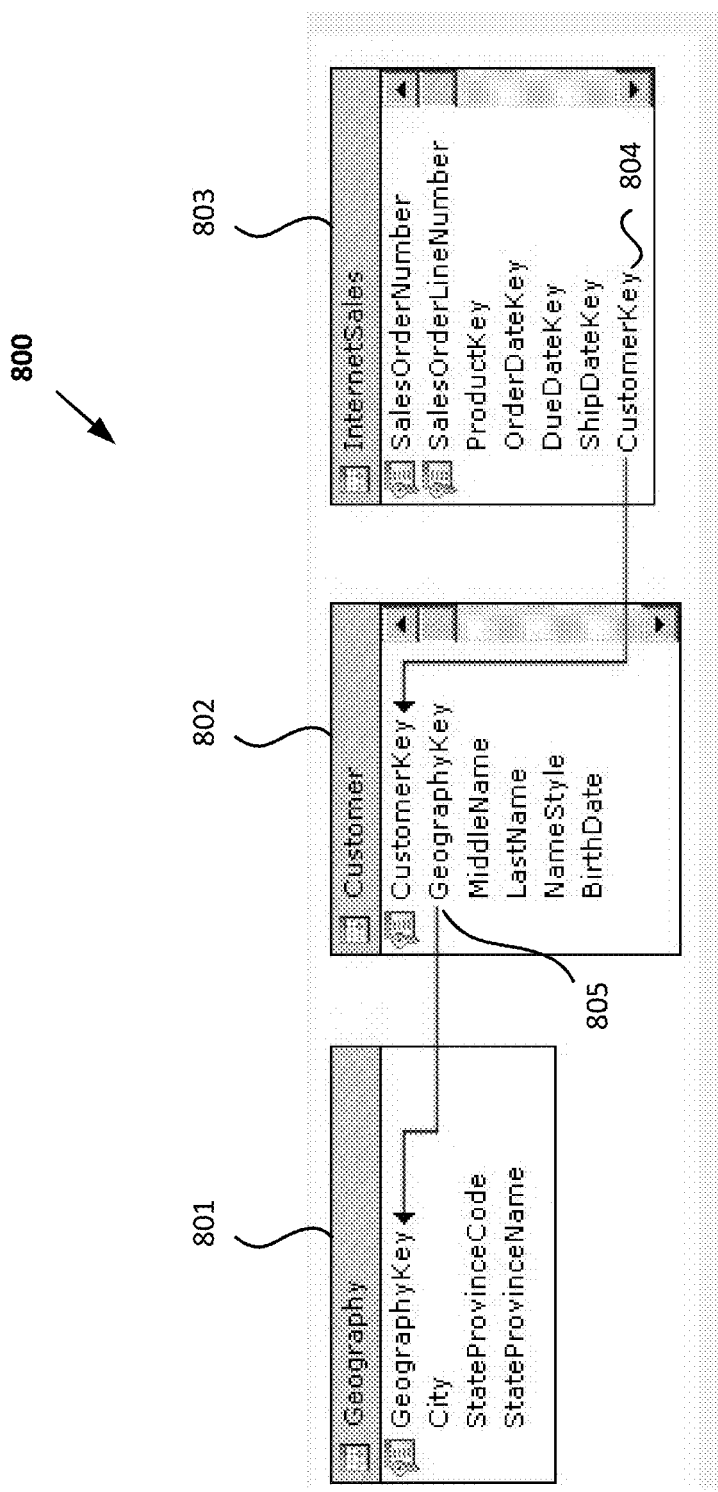
FIG. 8 is a block diagram depicting an example of a set of tables for implementing referential dimensions.

Referring now to FIG. 8, there is shown an example of a set of tables for implementing referential dimensions. CustomerKey field 804 in Internet Sales table 803 points to Customer dimension table 802 (which is a regular or intermediate dimension table). GeographyKey field 805 in Customer dimension table 802 points to Geography table 801 (which is a reference dimension).

Distinct Dependent Dimensions

The techniques presented herein expand the notion of multiple hierarchies beyond those that involve the same object type (such as time or location). Thus, as described in more detail below, distinct dependent dimensions can be supported based on different object types.

Figure 7:
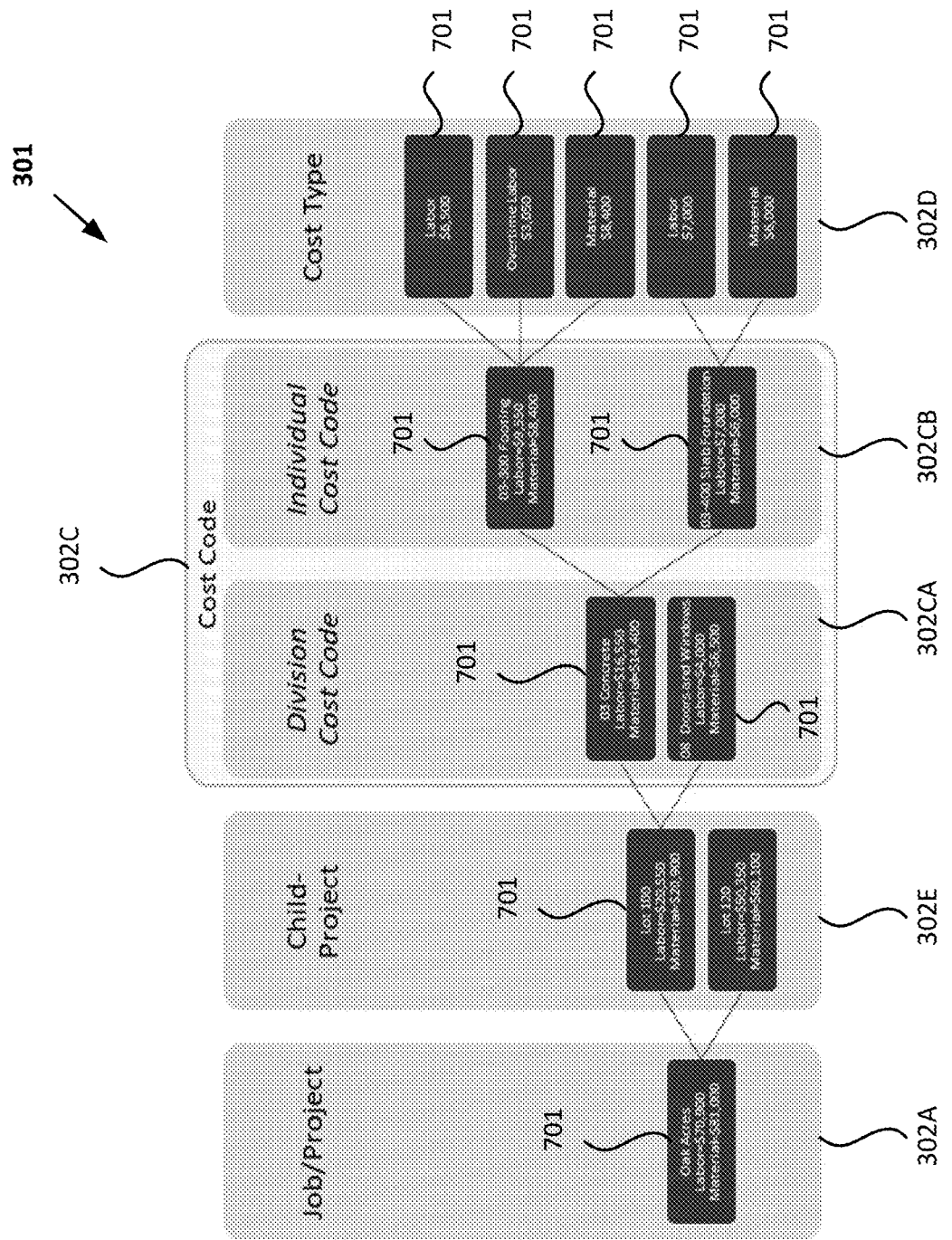
FIG. 7 is a block diagram depicting an example of a work breakdown structure (WBS) employing several distinct dependent dimensions that may be associated with different object types, as may be implemented according to one embodiment.

Referring now to FIG. 7, there is shown a block diagram depicting an example of a work breakdown structure (WBS) 301 employing several distinct dependent dimensions that may be associated with different object types, as may be implemented according to one embodiment.

In the example of FIG. 7, WBS 301 includes the following distinct dependent dimensions:
  Job/Project 302A;
  Child-Project 302E;
  Cost Code 302C (or Task), including Division Cost Code 302CA and Individual Cost Code 302CB; and
  Cost Type 302D.

The various distinct dependent dimensions 302 shown in FIG. 7 can be associated with different object types, and can thereby include different types of data. Example dimension values 701 are shown to illustrate the hierarchical relationship among the various distinct dependent dimensions 302, as well as the diversity in object types among values 701. In addition, in at least one embodiment, each of the distinct dependent dimensions 302 shown in FIG. 7 can have a hierarchy in itself.

In at least one embodiment, cost type dimension 302D specifies granular cost and breakdowns for all aspects of a construction project, including the type of work to perform, as well as the type of costs for each type of work. Cost type dimension 302D allows for tracking of costs for a specific task broken down into materials, labor, subcontracts, equipment cost, other, and overhead for that task.

In at least one embodiment, the use of cost type dimension 302D can simplify the process of capturing and categorizing project cost detail at a cost level. For example, a structural concrete cost code (or task) may include labor, rented equipment, and other operational costs. Cost type dimension 302D can be used to track actual cost, when the work starts and stops, and percentage completion by element (labor, rented equipment and operational costs).

In at least one embodiment, enabling cost type dimension 302D adds a cost type field to transaction pages in other applications, allowing user 100 to track project+cost code (task)+cost type when performing data entry. Subsequently cost type information can be used in order to generate reports on projects at a more granular level.

To promote consistency when posting transactions, GL accounts (for Accounts Payable and Project estimates) and items (for Purchasing, Inventory, and Order Entry) can be associated with cost types. The system can then be configured to pre-fill GL account information when using cost types.

Method

Figure 3:
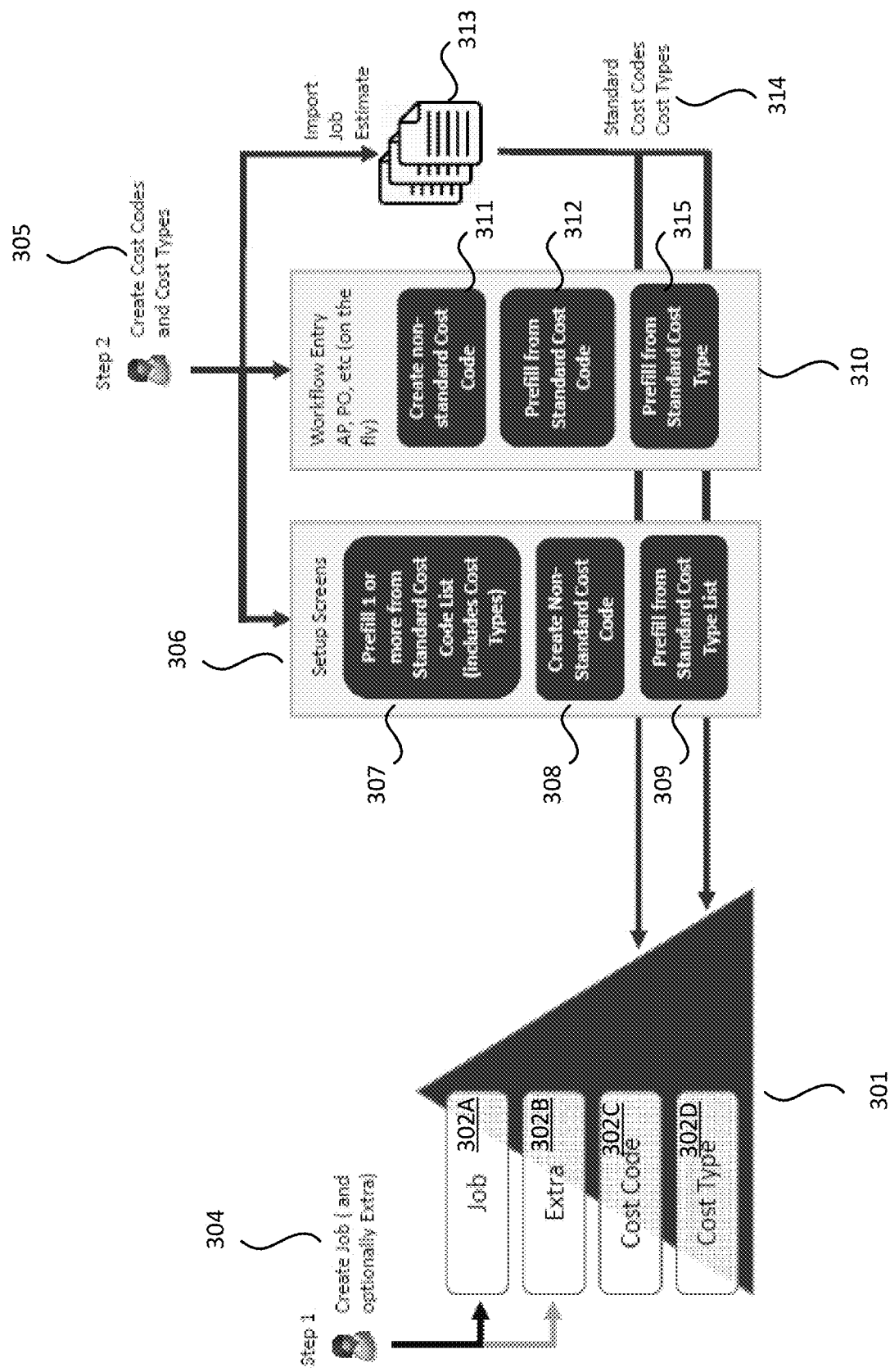
FIG. 3 is a flow diagram depicting an overall method for generating a work breakdown structure (WBS) employing distinct dependent dimensions associated with different object types, according to one embodiment.

Referring now to FIG. 3, there is shown a block diagram depicting an overall method for creating a tiered WBS 301 employing distinct dependent dimensions associated with different object types, according to one embodiment.

As a first step, a job 302A is created 304 as an initial dimension for tiered WBS 301. In at least one embodiment, creation step 304 can be performed in response to user 100 selecting a job from a user interface screen. For example, job dimension 302A may be created by duplicating a template job. In at least one embodiment, job 302A can be representing internally by a software object, such as a project object. Thus, for purposes of the description herein, job dimension 302A may be referred to as "project dimension". In addition, an optional "extra" level 302B can be provided under job 302A, which may represent, for example, a sub-project, floor, extra wing, or any entity that may need an extra level of cost tracking; thus, step 304 can also include specifying extra level 302B representing such a sub-project or other entity. In at least one embodiment, extra level 302B can be implemented as a child project.

As shown in FIG. 3, tiered WBS 301 can also include additional levels of distinct dependent dimensions, such as cost code 302C and cost type 302D. In at least one embodiment, a cost code 302C may be equivalent to a task; therefore, for descriptive purposes herein, the terms "cost code" and "task" are used interchangeably. Cost code 302C (or task) may be, for example, a specific type of work in construction. In at least one embodiment, cost codes 302C may be grouped under one or more hierarchical cost code divisions. In at least one embodiment, using cost code dimension 302C can simplify the process of capturing task data for projects as transactions are entered. In at least one embodiment, the uniqueness of cost code 302C (task) is bound to a specific project, so that user 100 may be required to identify a project before being presented with options for selecting cost codes 302C (task).

For example "03-300 Footings" is a specific type of work grouped under a division of 03 Concrete.

In at least one embodiment, costs can be summarized based on individual cost codes 302C and also at each parent division(s). Thus, when cost code dimension 302C is enabled, a cost code (task) field can be added to transaction pages so that user 100 can select both a project 302A and a specific cost code 302C (task) in that project when performing data entry. Cost code(s) 302C can subsequently be specified when reporting, so as to provide a more granular, task-based level.

Cost types 302D may describe the type of cost, such as labor or material. In at least one embodiment, each cost type 302D is summarized at higher levels of WBS 301 by an accumulation type. Accumulation types can be used to group and summarize cost type information for reporting, and can be associated with cost types 302D. Some examples of accumulation types are Material, Subcontract, Labor, Equipment, Overhead, or Other. In at least one embodiment, cost type 302D may be implemented as a new dimension.

In at least one embodiment, cost code 302C (task) and cost type 302D can be generated in step 305. Several mechanisms involved in specifying cost code 302C and cost type 302D are shown.

In at least one embodiment, job estimate 313 is imported, and standard catalogs 314 containing cost codes (tasks) and cost types are extracted from the imported job estimate 313. Workflow entry steps 310 may include creating 311 one or more non-standard cost code(s), pre-filling 312 a cost code from those extracted from job estimate 313, and pre-filling 315 a cost type from those extracted from the imported job estimate 313. Importing job estimate 313 including catalogs 314 containing standard cost codes (tasks) and cost types may be performed instead of creating job 302A from a template, as described above.

In at least one embodiment, standard catalog 314 may contains a list of standard definitions for cost codes 302C (tasks) and/or cost types 302D. These may, for example, include templates for creating such objects. User 100 can select definitions from standard catalog 314 to a project, so that the selected definitions will be used as a basis for new cost codes 302C (tasks) and/or cost types 302D. For example, user 100 can define standard definitions with industry-specific values. Then, when user 100 selects definitions from standard catalog 314, the selected definitions are used to populate new cost codes 302C (tasks) and/or cost types 302D with the industry-specific values specified in the selected definitions. After adding cost codes 302C (tasks) and/or cost types 302D to the project, user 100 can change any prefilled values as desired. In this manner, definitions from standard catalog 314 can form a template upon which to base cost codes 302C (tasks) and/or cost types 302D.

In at least one embodiment, job 302A (which may also be referred to as a "project") is the highest level of dimension for tiered WBS 301. In at least one embodiment, estimates and actual costs are captured at the lowest level of WBS 301 and summarized through each tier up to job 302A.

A number of setup screens 306 can be provided for constructing WBS 301. These may include screen 307 for pre-filling one or more cost code(s) 302C from standard catalogs 314 containing cost codes (tasks) and/or cost types, screen 308 for creating one or more non-standard cost code(s) 302C, and screen 309 for pre-filling one or more cost type(s) 302D from standard catalogs 314 generated from imported job estimate 313. In at least one embodiment, standard cost code(s) 302C that may be pre-filled using screen 307 may include a set of standard cost type(s) 302D; thus, selecting one or more cost code(s) 302C may serve to specify the list of available standard cost type(s) 302D.

Figure 4:
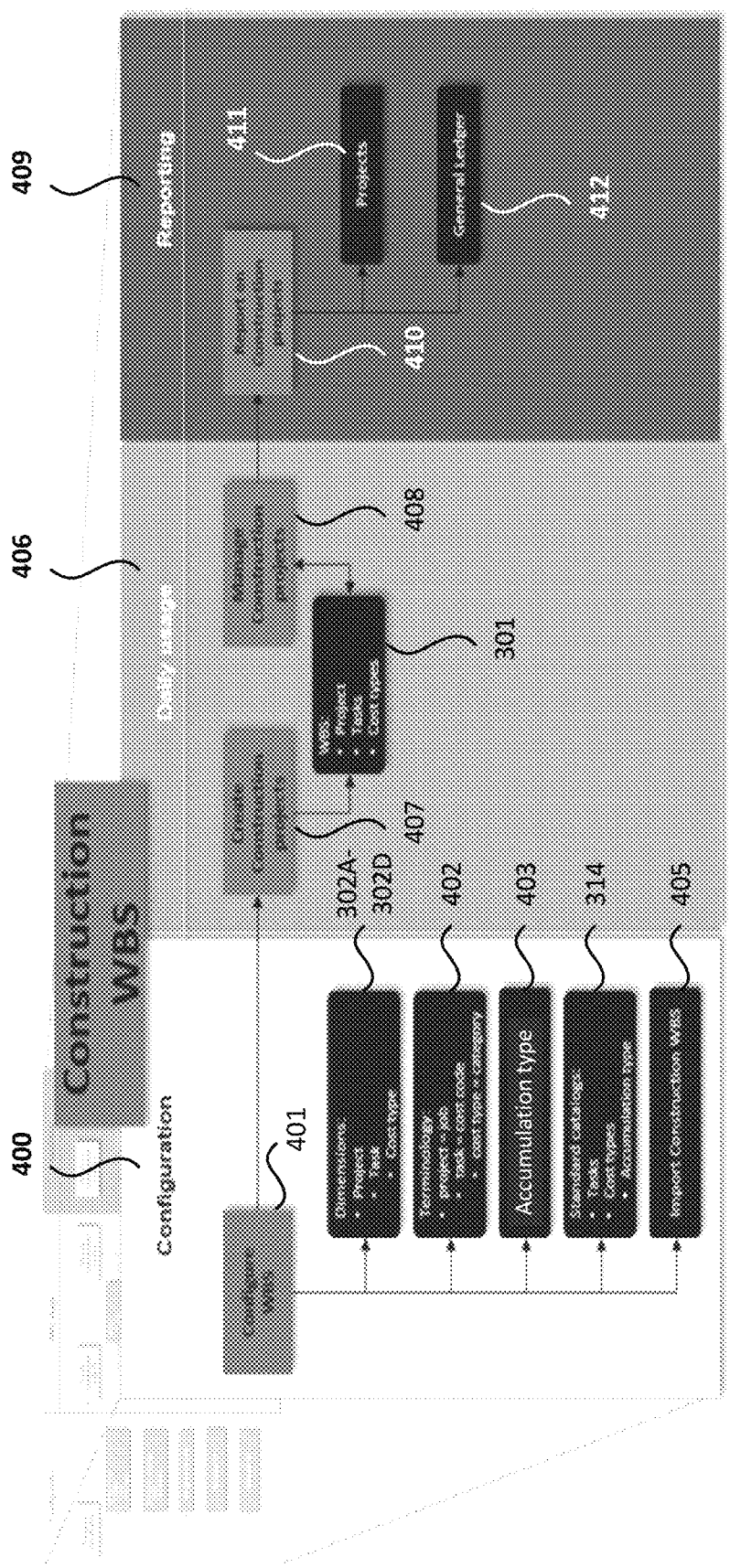
FIG. 4 is a flow diagram depicting details and workflow for a method for configuring and using a work breakdown structure (WBS) employing distinct dependent dimensions, according to one embodiment.

Referring now to FIG. 4, there is shown a flow diagram depicting details and workflow for a method for configuring and using a work breakdown structure (WBS) 301 employing distinct dependent dimensions, according to one embodiment.

Configuration stage 400 includes various steps involved in configuring 401 WBS 301. These may include, for example:
- defining and/or specifying distinct dependent dimensions 302A-302D, which may be associated with different object types, as described above in connection with FIG. 3 (in at least one embodiment, this can include defining job (or project) dimension 302A, cost code (or task) dimension 302C, and cost type dimension 302D, in that order);
- defining and/or specifying terminology 402 for WBS 301 (for example: project=job, task=cost code, cost type=category);
- defining and/or specifying accumulation type 403;
- defining and/or specifying standard catalogs 314 containing cost codes (tasks), cost types, and/or accumulation type;
- importing 405 a dimension hierarchy including project, task and cost type for WBS 301, for example for a construction project or enterprise.

Once stage 400 has been completed, daily usage 406 can commence, wherein projects (such as construction projects) can be created 407 and managed 408 using the configured WBS 301.

Reporting stage 409 includes generating reports 410 on projects (such as construction projects). Such reports can be generated and configured using the configured WBS 301, so as to enable classification, grouping, and reporting on transactions in various ways. Reports 410 can provide information on projects 411, and can include general ledger information 412.

Figure 5A:
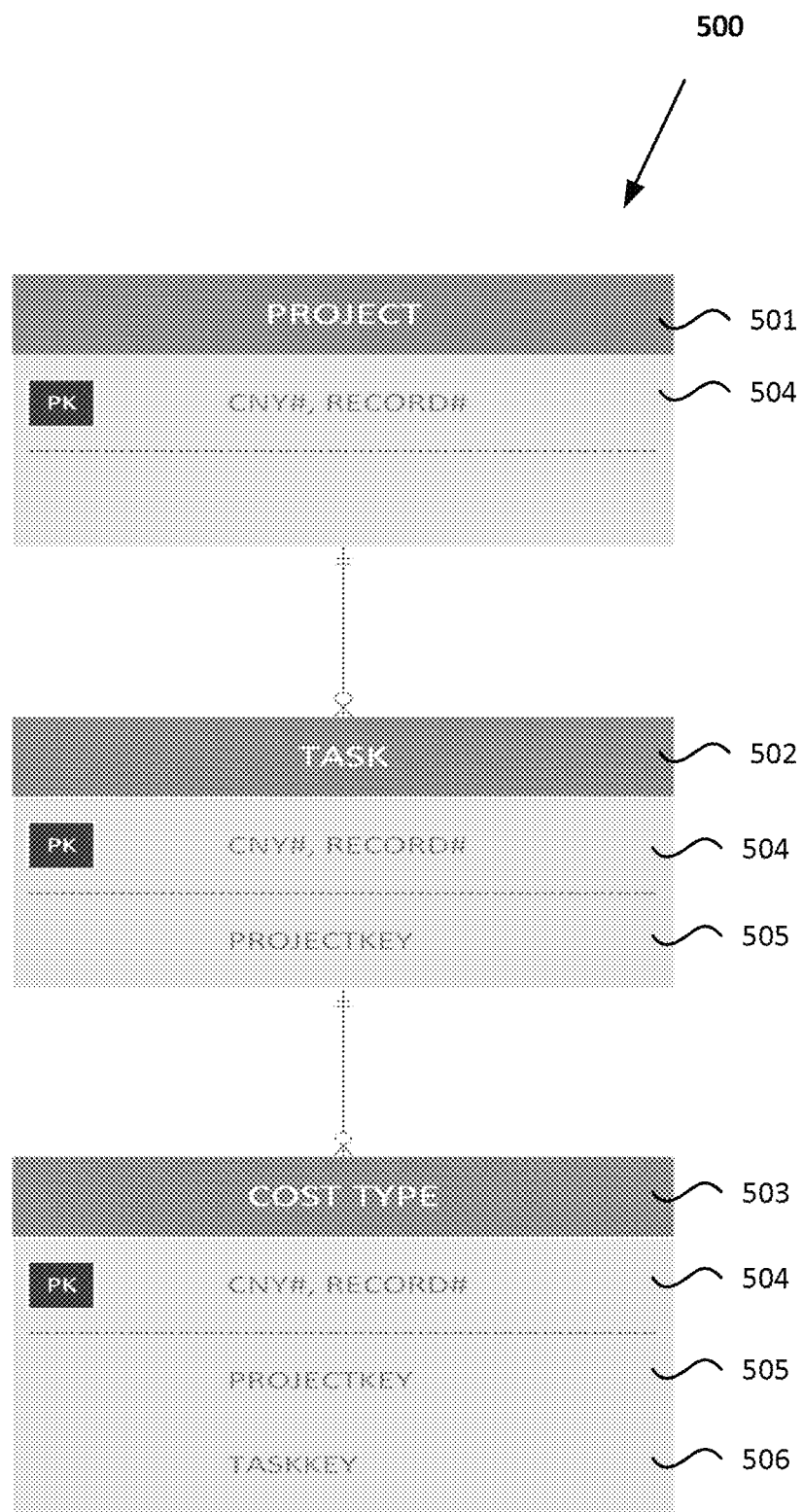
FIG. 5A is a block diagram depicting an example of a data model for implementing distinct dependent dimensions according to one embodiment.

Referring now to FIG. 5A, there is shown is a block diagram depicting an example of a data model 500 for implementing distinct dependent dimensions according to one embodiment.

In this example, project object 501 includes a unique company identifier, referred to herein as a "CNY number," and record number 504. Task object 502 is positioned below project object 501 in the hierarchy defined by data model 500; task object 502 inherits CNY number from project object 501, and also includes project key 505. Cost type object 503 is positioned below task object 502 in the hierarchy defined by data model 500; cost type object 503 inherits CNY number, as well as project key 505, from task object 502, and also includes task key 505.

In at least one embodiment, data model 500 as depicted in FIG. 5A specifies dependencies among various data items. For example, project object 501 and task object 502 may need to exist before cost type object 503 is created, so that the referential integrity with project and task objects 501, 502 can be correctly configured.

Figure 5B:
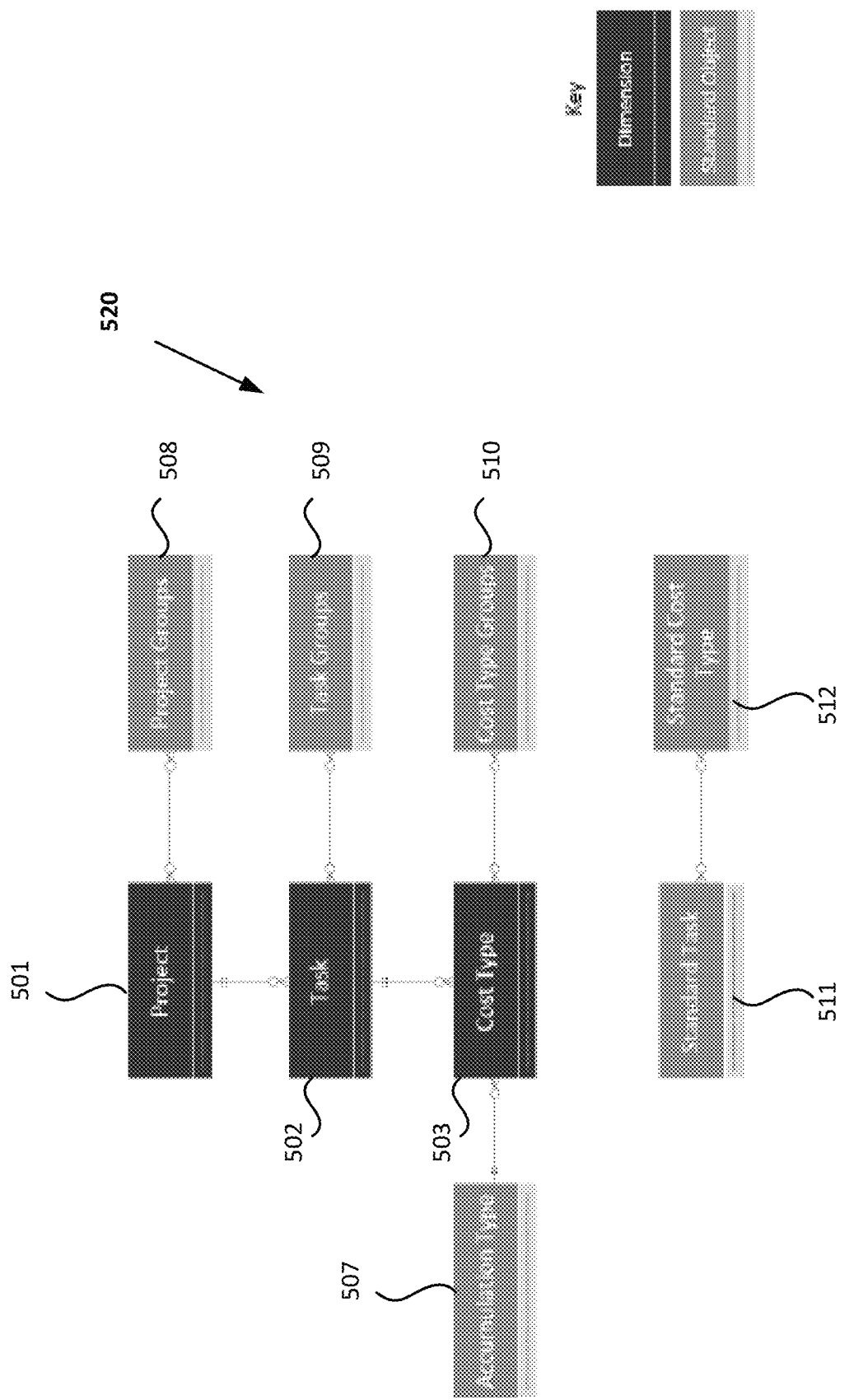
FIG. 5B is a block diagram depicting an example of an entity relationship for a work breakdown structure (WBS) employing distinct dependent dimensions, according to one embodiment.

Referring now to FIG. 5B, there is shown a block diagram depicting an example of an entity relationship 520 for a work breakdown structure (WBS) employing distinct dependent dimensions, according to one embodiment.

Entity relationship diagram 520 shows project object 501, task object 502, and cost type object 503, all representing distinct dependent dimensions, which may be associated with different object types. As mentioned above, task object 502 inherits information from project object 501, and cost type object 503 inherits information from task object 502. Based on these dependencies, when entering transactions, a dimension picklist or menu can be filtered based on those dimensions that are higher in relationship diagram 520. In at least one embodiment, cost type 503 uses a particular accumulation type 507.

In at least one embodiment, there may be a one-to-many relationship between project and task; a single project can have many tasks. A similar one-to-many relationship can be established between task and cost types.

In at least one embodiment, project groups 508, task groups 509, and cost type groups 510 can be provided. In addition, standard tasks 511 and/or standard cost types 512 can be provided, to enable pre-filling of tasks and cost types and thereby streamline WBS creation.

User Interface

Figure 9:
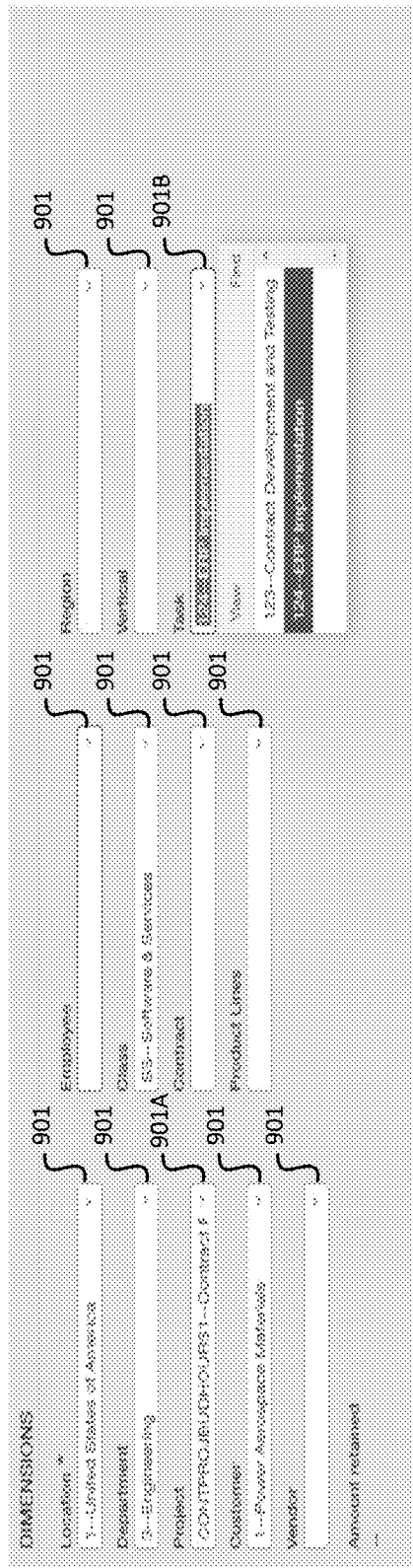
FIG. 9 depicts an example of a user interface allowing user to select distinct dependent dimensions from various menus, including dependent dimensions associated with different object types, according to one embodiment.

Referring now to FIG. 9, there is shown an example of a user interface 900 allowing user 100 to select distinct dependent dimensions from various menus 901, including dimensions associated with different object types, according to one embodiment. In this example, user 100 can first select a project from menu 901A. The system then narrows down the list of available tasks to those that are associated with the selected project, and presents the available tasks in menu 901B. User 100 can then select a task from menu 901B. Any number of levels of such hierarchy can be provided. For example, once a task has been selected, the system can narrow down the list of available cost types based on the selected task; user 100 can then select a cost type, for example from a menu that contains those that are associated with the selected task.

In at least one embodiment, the user interface can allow user 100 to directly select a cost type based on some representation of the record key. In another embodiment, the user interface can allow user 100 to directly select a cost type directly, for example based on a particular project-task-cost type combination. This may be accomplished, for example, by uniquely identifying a parent task record and a grandparent project record, given a record key of a cost type.

Creating Cost Types

In at least one embodiment, when a cost type is created, it is generated based on a standard cost type, which may be a template specifying certain fields. The system copies the specified fields to the instance of the cost type being created. For example, standard cost type templates may be established for Equipment, Labor, Material, and/or the like.

Implementation

In at least one embodiment, dependent dimension relationships can be implemented at a dimension entity definition level. For example, a dependent dimension entity definition can be specified as:

```
'task' => array(
    'path' => 'TASKID',
    'dependent_dimension_relationship' => array(
        'parent' => 'project',
        'child' => 'costtype',
    ),
),
'costtype' => array(
    'path' => 'COSTTYPEID'
    'fullname' => 'Cost type',
    . . .
    'dependent_dimension_relationship' => array(
        'parent' => 'task',
    ),
),
```

In key workflows where a child dimension is used, the system ensures that parent dimensions are available and specified correctly. Subsequently, child dimensions can be selected and operated on.

In at least one embodiment, once dependent dimension relationships are defined, they can be used when extracting dependent dimension details at runtime and then filtering options presented via a user interface element, as follows:

```
if
(is_array($params['dependent_dimension_relationship'])) {
    // find the child dimension definition . . .
    $childDimID =
$params['dependent_dimension_relationship'] ['child'];
        $childParams = $reportDims[$childDimID];
        $parentDimID =
$params['dependent_dimension_relationship'] ['parent'];
        $parentParams = $reportDims[$parentDimID];
    . . .
        $onchange = ' dependentDimensionHan-
dler(this, " ' . $dimPath . ' ", " ' . $parentId . ' ", " ' .
$childPath . ' ", " ' . $grandChildId . ' ", ' . $paramsAsJSON
. ' ); ';
    }
```

Although the above example shows an entity definition including up to three levels of parent-child relationship, one skilled in the art will recognize that the depicted techniques can be extended to any number of levels.

Reports

Figure 10:
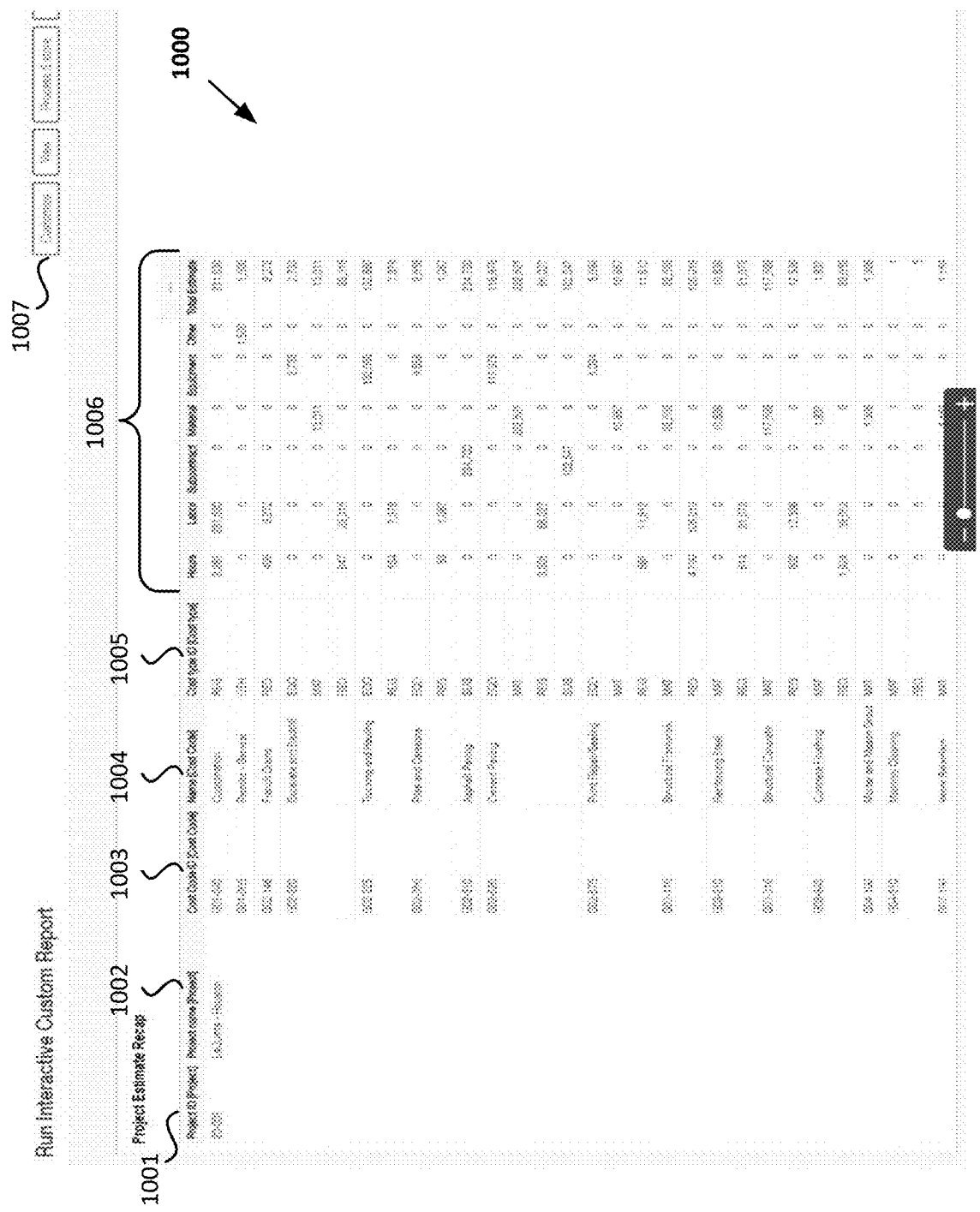
FIG. 10 depicts an example of a report that may be generated using distinct dependent dimensions, including dimensions associated with different object types, according to one embodiment.

Referring now to FIG. 10, there is shown an example of a report 1000 that may be generated using distinct dependent dimensions, including dimensions associated with different object types, according to one embodiment. Transactions can be filtered and/or sorted according to any number of distinct dependent dimensions. In this example, report 1000 includes columns for various distinct dependent dimensions, including:

Column 1001, indicating Project ID;
Column 1002, indicating Project Name;
Column 1003, indicating Cost Code ID;
Column 1004, indicating Cost Code Name;
Column 1005, indicating Cost Type ID; and
Columns 1006, indicating values for the transaction.

One skilled in the art will recognize that the layout and arrangement shown in FIG. 10 is merely exemplary, and that reports of many different types and forms can be generated using distinct dependent dimensions. In at least one embodiment, reports such as report 1000 can be interactive, allowing user 100 to change parameters and view results, such as via Customize button 1007.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics.

Extensibility

The particular examples set forth herein are provided for illustrative purposes only. In various embodiments, the described techniques are extensible, and can be used by other standard dimensions to define dependencies among different dimension objects, including those associated with different object types. In at least one embodiment, dependencies can be specified among user-defined dimensions. In addition, the described techniques can be used for any verticals and/or domains.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Washington; MacOS, available from Apple Inc. of Cupertino, California; iOS, available from Apple Inc. of Cupertino, California; Android, available from Google, Inc. of Mountain View, California; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for specifying and applying distinct dependent dimensions to classify accounting transactions, comprising:
    at a hardware processor, defining a plurality of dimensions for classifying accounting transactions, and further defining a dimension hierarchy comprising a set of hierarchical dependency relationships among the defined dimensions, wherein:
    each dimension is associated with an object type that is different from an object type of at least one other dimension;
    at least one dimension is associated with a top level within the hierarchy;
        each other dimension is associated with a level lower than the top level; and
        the hierarchy defines each lower-level dimension as being dependent on at least one higher-level dimension, with at least one lower-level dimension being valid with at least two different higher-level dimensions;
    at an electronic storage device, storing electronic representations of the defined dimensions and electronic representations of the hierarchical dependency relationships;
    at the hardware processor, determining an original set of possible values for the defined dimensions;
    at the hardware processor, establishing a value for a first one of the dimensions at a first level of the hierarchy;
    at an output device, displaying the established value;
    at the hardware processor, filtering a set of possible values for at least one additional dimension, wherein each additional dimension is at a level that is lower than the first level, and wherein the filtered set of possible values for each additional dimension is reduced from the original set of possible values, at least in part, based on at least one established value for at least one dimension at a level that is higher than the level of the additional dimension;
    for each additional dimension:
        at the output device, displaying a list comprising a plurality of items, wherein each item in the list comprises one of the possible values from the filtered set for that additional dimension, and wherein the list omits any values that are not among the filtered set of possible values for that additional dimension;
        at the output device, displaying a graphical user interface allowing selection among the listed items;
        at an input device, receiving input from a user selecting one of the listed items; and
        at the hardware processor, establishing a value for that additional dimension corresponding to the selected item; and
    at the electronic storage device, storing electronic representations of the established values for the first dimension and for each additional dimension.

2. The method of claim 1, wherein the first and second dimension define a work breakdown structure.

3. The method of claim 1, wherein establishing the value for the first one of the dimensions comprises:
    at the input device, receiving first user input selecting a value for the first one of the dimensions from the determined original set of possible values for the first one of the dimensions; and
    assigning the value selected in the first user input.

4. The method of claim 1, wherein the accounting transactions relate to a construction firm.

5. The method of claim 1, further comprising:
    at the hardware processor, importing a job estimate;
    and wherein:
    establishing the value for the first dimension comprises establishing the value based on the imported job estimate.

6. The method of claim 1, further comprising:
    at the hardware processor, determining a set of standard values for at least one of the dimensions;
    and wherein:
    establishing the value for at least one of the dimensions comprises establishing the value based on at least one of the determined standard values.

7. The method of claim 1, further comprising:
    at the hardware processor, determining at least one accumulation type for at least one dimension.

8. The method of claim 1, further comprising:
    at the hardware processor, generating at least one report on accounting transactions based on the established values for the first dimension and for each additional dimension; and
    at an output device, outputting the generated report.

9. The method of claim 1, further comprising:
    at the hardware processor, classifying a plurality of accounting transactions based on the established values for the first dimension and for each additional dimension.

10. The method of claim 1, wherein:
    the first dimension corresponds to at least one of a job and a project; and
    each additional dimension corresponds to at least one selected from the group consisting of:
    a child project;
    a cost code; and
    a cost type.

11. A non-transitory computer-readable medium for specifying and applying distinct dependent dimensions to classify accounting transactions, comprising instructions stored thereon, that when performed by a hardware processor, perform the steps of:
    defining a plurality of dimensions for classifying accounting transactions, and further defining a dimension hierarchy comprising a set of hierarchical dependency relationships among the defined dimensions, wherein:
    each dimension is associated with an object type that is different from an object type of at least one other dimension;
    at least one dimension is associated with a top level within the hierarchy;
        each other dimension is associated with a level lower than the top level; and
        the hierarchy defines each lower-level dimension as being dependent on at least one higher-level dimension, with at least one lower-level dimension being valid with at least two different higher-level dimensions;
    causing an electronic storage device to store electronic representations of the defined dimensions and electronic representations of the hierarchical dependency relationships;

determining an original set of possible values for the defined dimensions;

establishing a value for a first one of the dimensions at a first level of the hierarchy;

causing an output device to display the established value;

filtering a set of possible values for at least one additional dimension, wherein each additional dimension is at a level that is lower than the first level, and wherein the filtered set of possible values for each additional dimension is reduced from the original set of possible values, at least in part, based on at least one established value for at least one dimension at a level that is higher than the level of the additional dimension;

for each additional dimension:

for each additional dimension, causing the output device to display a list comprising a plurality of items, wherein each item in the list comprises one of the possible values from the filtered set for that additional dimension, and wherein the list omits any values that are not among the filtered set of possible values for that additional dimension;

causing the output device to display a graphical user interface allowing selection among the listed items;

causing an input device to receive input from a user selecting one of the listed items; and establishing a value for that additional dimension corresponding to the selected item; and causing an electronic storage device to store electronic representations of the established values for the first dimension and for each additional dimension.

12. The non-transitory computer-readable medium of claim 11, wherein the first and second dimension define a work breakdown structure.

13. The non-transitory computer-readable medium of claim 11, wherein establishing the value for the first one of the dimensions comprises:

causing the input device to receive first user input selecting a value for the first one of the dimensions; and assigning the value selected in the first user input.

14. The non-transitory computer-readable medium of claim 11, wherein the accounting transactions relate to a construction firm.

15. The non-transitory computer-readable medium of claim 11, further comprising instructions stored thereon, that when performed by the hardware processor, perform the step of:

importing a job estimate;

and wherein:

establishing the value for the first dimension comprises establishing the value based on the imported job estimate.

16. The non-transitory computer-readable medium of claim 11, further comprising instructions stored thereon, that when performed by the hardware processor, perform the step of:

determining a set of standard values for at least one of the dimensions;

and wherein:

establishing the value for at least one of the dimensions comprises establishing the value based on at least one of the determined standard values.

17. The non-transitory computer-readable medium of claim 11, further comprising instructions stored thereon, that when performed by the hardware processor, perform the step of:

determining at least one accumulation type for at least one dimension.

18. The non-transitory computer-readable medium of claim 11, further comprising instructions stored thereon, that when performed by the hardware processor, perform the steps of:

generating at least one report on accounting transactions based on the established values for the first dimension and for each additional dimension; and causing an output device to output the generated report.

19. The non-transitory computer-readable medium of claim 11, further comprising instructions stored thereon, that when performed by the hardware processor, perform the step of:

classifying a plurality of accounting transactions based on the established values for the first dimension and for each additional dimension.

20. The non-transitory computer-readable medium of claim 11, wherein:

the first dimension corresponds to at least one of a job and a project; and each additional dimension corresponds to at least one selected from the group consisting of:

a child project;

a cost code; and a cost type.

21. A system for specifying and applying distinct dependent dimensions to classify accounting transactions, comprising:

an output device;

a hardware processor, communicatively coupled to the, output device, configured to:

define a plurality of dimensions for classifying accounting transactions, and further defining a dimension hierarchy comprising a set of hierarchical dependency relationships among the defined dimensions, wherein:

each dimension is associated with an object type that is different from an object type of at least one other dimension;

at least one dimension is associated with a top level within the hierarchy;

each other dimension is associated with a level lower than the top level; and the hierarchy defines each lower-level dimension as being dependent on at least one higher-level dimension, with at least one lower-level dimension being valid with at least two different higher-level dimensions;

determine an original set of possible values for the defined dimensions; and establish a value for a first one of the dimensions at a first level of the hierarchy;

cause the output device to display the established value;

filter a set of possible values for at least one additional dimension, wherein each additional dimension is at a level that is lower than the first level, and wherein the filtered set of possible values for each additional dimension is reduced from the original set of possible values, at least in part, based on at least one established value for at least one dimension at a level that is higher than the level of the additional dimension;

cause the output device to, for each additional dimension, display a list comprising a plurality of items, wherein each item in the list comprises one of the possible values from the filtered set for that additional dimension, and wherein the list omits any values that are not among the filtered set of possible values for that additional dimension; and cause the output device to display a graphical user interface allowing selection among the listed items;

an input device, communicatively coupled to the hardware processor, configured to, for each additional dimension, receive input from a user selecting one of the listed items; and an electronic storage device, communicatively coupled to the hardware processor, configured to store electronic representations of the defined dimensions, electronic representations of the hierarchical dependency relationships, and electronic representations of the established values for the first dimension and for each additional dimension;

wherein:

the hardware processor is further configured to establish a value for each additional dimension corresponding to the selected item.

22. The system of claim 21, wherein the first and second dimension define a work breakdown structure.

23. The system of claim 21, wherein:

the input device is further configured to receive first user input selecting a value for the first one of the dimensions from the determined original set of possible values for the first one of the dimensions; and establishing the value for the first one of the dimensions comprises assigning the value selected in the first user input.

24. The system of claim 21, wherein the accounting transactions relate to a construction firm.

25. The system of claim 21, wherein the hardware processor is further configured to import a job estimate;

and wherein establishing the value for the first dimension comprises establishing the value based on the imported job estimate.

26. The system of claim 21, wherein the hardware processor is further configured to determine a set of standard values for at least one of the dimensions;

and wherein establishing the value for at least one of the dimensions comprises establishing the value based on at least one of the determined standard values.

27. The system of claim 21, wherein the hardware processor is further configured to determine at least one accumulation type for at least one dimension.

28. The system of claim 21, further comprising:

an output device, communicatively coupled to the hardware processor;

wherein:

the hardware processor is further configured to generate at least one report on accounting transactions based on the established values for the first dimension and for each additional dimension; and the output device is configured to output the generated report.

29. The system of claim 21, wherein the hardware processor is further configured to classify a plurality of accounting transactions based on the established values for the first dimension and for each additional dimension.

30. The system of claim 21, wherein:

the first dimension corresponds to at least one of a job and a project; and each additional dimension corresponds to at least one selected from the group consisting of:

a child project;

a cost code; and a cost type.

* * * * *